(12) United States Patent
Gula et al.

(10) Patent No.: US 9,467,464 B2
(45) Date of Patent: Oct. 11, 2016

(54) SYSTEM AND METHOD FOR CORRELATING LOG DATA TO DISCOVER NETWORK VULNERABILITIES AND ASSETS

(71) Applicant: Tenable Network Security, Inc., Columbia, MD (US)

(72) Inventors: Ron Gula, Marriotsville, MD (US); Marcus Ranum, Morrisdale, PA (US); Renaud Deraison, New York, NY (US)

(73) Assignee: Tenable Network Security, Inc., Columbia, MD (US)

( * ) Notice: Subject to any disclaimer, the term of this patent is extended or adjusted under 35 U.S.C. 154(b) by 267 days.

(21) Appl. No.: 13/858,367

(22) Filed: Apr. 8, 2013

(65) Prior Publication Data

US 2014/0283083 A1 Sep. 18, 2014

Related U.S. Application Data

(60) Provisional application No. 61/791,032, filed on Mar. 15, 2013.

(51) Int. Cl.
*H04L 29/06* (2006.01)

(52) U.S. Cl.
CPC ....... *H04L 63/1433* (2013.01); *H04L 63/1408* (2013.01)

(58) Field of Classification Search
CPC ........... H04L 63/1433; H04L 63/1441; H04L 63/20; H04L 41/22; H04L 41/142; G06F 11/00
USPC ................................ 726/1, 4, 22–25; 714/20
See application file for complete search history.

(56) References Cited

U.S. PATENT DOCUMENTS

| | | | |
|---|---|---|---|
| 4,525,599 | A | 6/1985 | Curran et al. |
| 5,541,997 | A | 7/1996 | Pappas et al. |
| 5,572,729 | A | 11/1996 | Giordano et al. |
| 5,715,391 | A | 2/1998 | Jackson et al. |
| 5,721,819 | A | 2/1998 | Galles et al. |

(Continued)

OTHER PUBLICATIONS

Wack, John, et al., "NIST Special Publication 800-42, Guideline on Network Security Testing", Computer Security Division, National Institute of Standards and Technology, Oct. 2003, pp. 1-92.

(Continued)

*Primary Examiner* — Kambiz Zand
*Assistant Examiner* — Noura Zoubair
(74) *Attorney, Agent, or Firm* — Muncy, Geissler, Olds & Lowe, P.C.

(57) ABSTRACT

The disclosure relates to a log correlation engine that may cross-reference or otherwise leverage existing vulnerability data in an extensible manner to support network vulnerability and asset discovery. In particular, the log correlation engine may receive various logs that contain events describing observed network activity and discover a network vulnerability in response to the logs containing at least one event that matches a regular expression in at least one correlation rule that indicates a vulnerability. The log correlation engine may then obtain information about the indicated vulnerability from at least one data source cross-referenced in the correlation rule and generate a report that the indicated vulnerability was discovered in the network, wherein the report may include the information about the indicated vulnerability obtained from the at least one data source cross-referenced in the correlation rule.

34 Claims, 3 Drawing Sheets

(56) References Cited

U.S. PATENT DOCUMENTS

| | | |
|---|---|---|
| 5,838,919 A | 11/1998 | Schwaller et al. |
| 5,844,817 A | 12/1998 | Lobley et al. |
| 6,154,775 A | 11/2000 | Coss et al. |
| 6,266,774 B1 | 7/2001 | Sampath et al. |
| 6,324,656 B1 | 11/2001 | Gleichauf et al. |
| 6,393,568 B1 | 5/2002 | Ranger et al. |
| 6,415,321 B1 | 7/2002 | Gleichauf et al. |
| 6,487,666 B1 | 11/2002 | Shanklin et al. |
| 6,499,107 B1 | 12/2002 | Gleichauf et al. |
| 6,510,509 B1 | 1/2003 | Chopra et al. |
| 6,606,663 B1 | 8/2003 | Liao et al. |
| 6,704,874 B1 | 3/2004 | Porras et al. |
| 6,711,127 B1 | 3/2004 | Gorman et al. |
| 6,789,202 B1 | 9/2004 | Ko et al. |
| 6,847,982 B2 | 1/2005 | Parker et al. |
| 6,873,617 B1 | 3/2005 | Karras |
| 6,882,728 B1 | 4/2005 | Takahashi et al. |
| 6,886,020 B1 | 4/2005 | Zahavi et al. |
| 6,952,779 B1 | 10/2005 | Cohen et al. |
| 6,957,348 B1 | 10/2005 | Flowers et al. |
| 6,968,377 B1 | 11/2005 | Gleichauf et al. |
| 7,013,395 B1 | 3/2006 | Swiler et al. |
| 7,017,186 B2 | 3/2006 | Day |
| 7,073,198 B1 | 7/2006 | Flowers et al. |
| 7,093,287 B1 | 8/2006 | Gusler et al. |
| 7,120,148 B1 | 10/2006 | Batz et al. |
| 7,134,141 B2 | 11/2006 | Crosbie et al. |
| 7,139,819 B1 | 11/2006 | Luo et al. |
| 7,162,742 B1 | 1/2007 | Flowers et al. |
| 7,181,769 B1 | 2/2007 | Keanini et al. |
| 7,237,264 B1 | 6/2007 | Graham et al. |
| 7,243,366 B2 | 7/2007 | Medvinsky et al. |
| 7,272,646 B2 | 9/2007 | Cooper et al. |
| 7,290,145 B2 | 10/2007 | Falkenthros |
| 7,310,687 B2 | 12/2007 | Psounis et al. |
| 7,324,551 B1 | 1/2008 | Stammers |
| 7,483,986 B2 | 1/2009 | Hanson et al. |
| 7,509,681 B2 | 3/2009 | Flowers et al. |
| 7,530,104 B1 | 5/2009 | Thrower et al. |
| 7,562,388 B2 | 7/2009 | Hackenberger et al. |
| 7,571,482 B2 | 8/2009 | Polyakov et al. |
| 7,594,273 B2 | 9/2009 | Keanini et al. |
| 7,603,711 B2 | 10/2009 | Scheidell |
| 7,653,647 B2 | 1/2010 | Borthakur et al. |
| 7,661,134 B2 | 2/2010 | Radatti |
| 7,735,100 B1 | 6/2010 | Sallam |
| 7,735,140 B2 | 6/2010 | Datla et al. |
| 7,739,377 B2 | 6/2010 | Benedetti et al. |
| 7,752,671 B2 | 7/2010 | Kotler et al. |
| 7,761,918 B2 | 7/2010 | Gula et al. |
| 7,774,848 B2 | 8/2010 | D'Mello et al. |
| 7,882,542 B2 | 2/2011 | Neystadt et al. |
| 7,895,651 B2 | 2/2011 | Brennan |
| 7,904,479 B2 | 3/2011 | Zuk |
| 7,904,962 B1 | 3/2011 | Jajodia et al. |
| 7,908,254 B2 | 3/2011 | Suermondt et al. |
| 7,926,113 B1 | 4/2011 | Gula et al. |
| 7,966,358 B2 | 6/2011 | Deolalikar et al. |
| 7,971,252 B2 | 6/2011 | Lippmann et al. |
| 7,975,298 B1 | 7/2011 | Venkatasubrahmanyam |
| 7,996,836 B1 | 8/2011 | McCorkendale et al. |
| 8,001,606 B1 | 8/2011 | Spertus |
| 8,015,284 B1 | 9/2011 | Isenberg et al. |
| 8,032,489 B2 | 10/2011 | Villella et al. |
| 8,126,853 B2 | 2/2012 | Sakamoto |
| 8,135,815 B2 | 3/2012 | Mayer |
| 8,135,823 B2 | 3/2012 | Cole et al. |
| 8,191,149 B2 | 5/2012 | Yun et al. |
| 8,201,257 B1 | 6/2012 | Andres et al. |
| 8,239,942 B2 | 8/2012 | Shanklin et al. |
| 8,850,263 B1* | 9/2014 | Yourtee et al. ............ 714/20 |
| 2001/0034847 A1 | 10/2001 | Gaul, Jr. |
| 2002/0019945 A1 | 2/2002 | Houston et al. |
| 2002/0093527 A1 | 7/2002 | Sherlock et al. |
| 2002/0100023 A1 | 7/2002 | Ueki et al. |
| 2002/0107841 A1 | 8/2002 | Hellerstein et al. |
| 2002/0138762 A1 | 9/2002 | Horne |
| 2002/0166063 A1 | 11/2002 | Lachman, III et al. |
| 2002/0199116 A1 | 12/2002 | Hoene et al. |
| 2003/0051026 A1 | 3/2003 | Carter et al. |
| 2003/0056116 A1 | 3/2003 | Bunker et al. |
| 2003/0135517 A1 | 7/2003 | Kauffman |
| 2003/0145225 A1 | 7/2003 | Bruton, III et al. |
| 2003/0196123 A1 | 10/2003 | Rowland et al. |
| 2003/0212779 A1 | 11/2003 | Boyter et al. |
| 2003/0220940 A1 | 11/2003 | Futoransky et al. |
| 2004/0003266 A1 | 1/2004 | Moshir et al. |
| 2004/0015719 A1 | 1/2004 | Lee et al. |
| 2004/0042470 A1 | 3/2004 | Cooper et al. |
| 2004/0093521 A1 | 5/2004 | Hamadeh et al. |
| 2004/0193918 A1 | 9/2004 | Green et al. |
| 2004/0250169 A1 | 12/2004 | Takemori et al. |
| 2005/0044390 A1 | 2/2005 | Trostle |
| 2005/0068928 A1 | 3/2005 | Smith et al. |
| 2005/0097199 A1 | 5/2005 | Woodard et al. |
| 2005/0108578 A1 | 5/2005 | Tajalli et al. |
| 2005/0128988 A1 | 6/2005 | Simpson et al. |
| 2005/0188419 A1 | 8/2005 | Dadhia et al. |
| 2005/0203886 A1 | 9/2005 | Wong |
| 2005/0203921 A1 | 9/2005 | Newman et al. |
| 2005/0229255 A1 | 10/2005 | Gula et al. |
| 2006/0010245 A1 | 1/2006 | Carnahan |
| 2006/0018466 A1 | 1/2006 | Adelstein et al. |
| 2006/0031476 A1 | 2/2006 | Mathes et al. |
| 2006/0117091 A1 | 6/2006 | Justin |
| 2006/0130144 A1 | 6/2006 | Wernicke |
| 2006/0161816 A1 | 7/2006 | Gula et al. |
| 2006/0184682 A1 | 8/2006 | Suchowski et al. |
| 2007/0028110 A1 | 2/2007 | Brennan |
| 2007/0028302 A1 | 2/2007 | Brennan et al. |
| 2007/0028304 A1 | 2/2007 | Brennan |
| 2007/0169190 A1 | 7/2007 | Kolton et al. |
| 2007/0240220 A1 | 10/2007 | Tuvell et al. |
| 2007/0271598 A1 | 11/2007 | Chen et al. |
| 2007/0277238 A1 | 11/2007 | Margalit et al. |
| 2008/0002725 A1 | 1/2008 | Alicherry et al. |
| 2008/0022400 A1 | 1/2008 | Cohen et al. |
| 2008/0046393 A1 | 2/2008 | Jajodia et al. |
| 2008/0047009 A1 | 2/2008 | Overcash et al. |
| 2008/0072285 A1 | 3/2008 | Sankaran et al. |
| 2008/0155084 A1 | 6/2008 | Yu et al. |
| 2008/0301765 A1* | 12/2008 | Nicol et al. ............ 726/1 |
| 2009/0013141 A1 | 1/2009 | Kinoshita |
| 2009/0044024 A1 | 2/2009 | Oberheide et al. |
| 2009/0049016 A1 | 2/2009 | Sakamoto |
| 2009/0077666 A1 | 3/2009 | Chen et al. |
| 2009/0177782 A1 | 7/2009 | Blatherwick et al. |
| 2010/0030780 A1 | 2/2010 | Eshghi et al. |
| 2010/0043066 A1 | 2/2010 | Miliefsky |
| 2010/0058431 A1 | 3/2010 | McCorkendale et al. |
| 2010/0058456 A1 | 3/2010 | Jajodia et al. |
| 2010/0077479 A1 | 3/2010 | Viljoen |
| 2010/0083381 A1 | 4/2010 | Khosravi et al. |
| 2010/0114842 A1 | 5/2010 | Forman et al. |
| 2010/0138925 A1 | 6/2010 | Barai et al. |
| 2010/0169975 A1 | 7/2010 | Stefanidakis et al. |
| 2010/0174921 A1 | 7/2010 | Abzarian et al. |
| 2010/0175106 A1 | 7/2010 | Diebler et al. |
| 2010/0175134 A1 | 7/2010 | Ali-Ahmad et al. |
| 2010/0175135 A1 | 7/2010 | Kandek et al. |
| 2010/0262688 A1 | 10/2010 | Hussain et al. |
| 2010/0281539 A1 | 11/2010 | Burns et al. |
| 2010/0281543 A1 | 11/2010 | Golomb et al. |
| 2010/0332593 A1 | 12/2010 | Barash et al. |
| 2011/0029772 A1 | 2/2011 | Fanton et al. |
| 2011/0047597 A1 | 2/2011 | Mahaffey et al. |
| 2011/0061104 A1 | 3/2011 | Sarraute Yamada et al. |
| 2011/0099620 A1 | 4/2011 | Stavrou et al. |
| 2011/0126287 A1 | 5/2011 | Yoo |
| 2011/0162070 A1 | 6/2011 | Krasser et al. |
| 2011/0185055 A1* | 7/2011 | Nappier ............ H04L 63/08 709/224 |
| 2011/0185431 A1 | 7/2011 | Deraison |
| 2011/0191854 A1 | 8/2011 | Giakouminakis et al. |

(56) References Cited

U.S. PATENT DOCUMENTS

| | | |
|---|---|---|
| 2011/0231934 A1 | 9/2011 | Davis et al. |
| 2011/0231935 A1 | 9/2011 | Gula et al. |
| 2011/0277034 A1 | 11/2011 | Hanson |
| 2011/0314245 A1 | 12/2011 | Hanes et al. |
| 2012/0011590 A1 | 1/2012 | Donovan |
| 2012/0158725 A1 | 6/2012 | Molloy et al. |
| 2012/0233700 A1 | 9/2012 | Ali-Ahmad et al. |

OTHER PUBLICATIONS

Deraison, Renaud, et al., "Passive Vulnerability Scanning Introduction to NeVo", Revision 9, Tenable Network Security, Aug. 2003, pp. 1-13.

Deraison, Renaud, et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin, et al., "Detecting Backdoors", Proceedings of the 9th USENIX Security Symposium, Denver, Colorado, Aug. 2000, 11 pages.

"Basic Cryptanalysis", Department of the Army, Field Manual No. 34-40-2, Sep. 13, 1990, 363 pages.

Kim, Gene H., et al., "The Design and Implementation of Tripwire: A File System Integrity Checker", Proceedings of the 2nd ACM Conference on Computer and Communications Security, 1994, (Purdue Technical Report CSD-TR-93-071), 18 pages.

Oline, Adam, et al., "Exploring Three-Dimensional Visualization for Intrusion Detection", Workshop on Visualization for Computer Security, IEEE, Oct. 26, 2005, 9 pages.

Gula, Ron, "Predicting Attack Paths: Leveraging active and passive vulnerability discovery to identify trusted exploitable weak points in your network", Tenable Network Security, Inc, Mar. 20, 2012, Revision 2.

"Strategic Anti-malware Monitoring with Nessus, PVS, & LCE", Tenable Network Security, Inc, May 29, 2012, Revision 1.

Hoagland, James A., "Audit Log Analysis Using the Visual Audit Browser Toolkit", Department of Computer Science, University of California, Davis.

Tenable Network Security, "Log Correlation Engine 4.0 High Performance Configuration Guide", Jul. 10, 2012, Revision 2.

Tenable Network Security, "Log Correlation Engine Best Practices", Mar. 2, 2012, Revision 2.

Gula, Ron, "Tenable Event Correlation", Tenable Network Security, Mar. 1, 2012, Revision 1.

FortiAnalyzer TM, Administration Guide, Version 4.0 MR2, Mar. 21, 2011, Revision 13.

Tenable Network Security, "Log Correlation Engine Asset & Vulnerability Discovery", 2012, p. 1-5.

Log Correlation Engine 4.0 Administration and User Guide, Tenable Network Security, Mar. 5, 2013, Revision 6.

Asadoorian, Paul, "Detecting Known Malware Processes Using Nessus", May 30, 2012.

* cited by examiner

SYSTEM AND METHOD FOR CORRELATING LOG DATA TO DISCOVER NETWORK VULNERABILITIES AND ASSETS

CROSS-REFERENCE TO RELATED APPLICATIONS

Pursuant to 35 U.S.C. §119, the present application claims priority to U.S. Provisional Patent Application Ser. No. 61/791,032, entitled "System and Method for Correlating Log Data to Discover Network Vulnerabilities and Assets," filed Mar. 15, 2013, the contents of which are hereby incorporated by reference in their entirety.

TECHNICAL FIELD

The system and method described herein generally relates to a system and method for correlating log data to discover network vulnerabilities and assets, and in particular, to a log correlation engine that may cross-reference or otherwise leverage existing vulnerability data in an extensible manner to support network vulnerability and asset discovery.

BACKGROUND

In many network environments, illegal or unauthorized users may exploit vulnerabilities in the network to gain access, deny access, or otherwise attack systems in the network. As such, to detect and remediate such network vulnerabilities, existing network security systems typically conduct vulnerability analysis in the network through manual inspection or network scans. For example, conventional network scanners (or "active vulnerability scanners") typically send packets or other messages to various devices in the network and then audit the network with information contained in any response packets or messages received from the devices in the network. Accordingly, physical limitations associated with the network typically limit the effectiveness for active vulnerability scanners because only devices that can communicate with the active vulnerability scanners can be audited, while actively scanning networks distributed over large areas or having large numbers of devices may take long amounts of time. For example, in a network that includes multiple routers, hosts, and other network devices, an active vulnerability scanner would typically have to send packets that traverse several routers to scan the hosts and other network devices, some of which may be inactive and therefore inaccessible to the active vulnerability scanner. Further, in scenarios where one or more of the routers have firewalls that screen or otherwise filter incoming and outgoing traffic, the active vulnerability scanner may generate incomplete results because the firewalls may prevent the active vulnerability scanner from auditing hosts or other devices behind the firewalls.

Furthermore, active vulnerability scanners typically create audit results that become stale over time because the audit results describe a static state for the network at a particular point in time. Thus, an active vulnerability scanner would likely fail to detect that hosts have been added or removed from the network following a particular active scan, whereby the audit results that active vulnerability scanners create tend to steadily decrease in value over time as changes to the network occur. Furthermore, active vulnerability scanners can have the tendency to cause network disruptions during an audit. For example, probing network hosts or other devices during an audit performed by an active vulnerability scanner may result in communication bottlenecks, processing overhead, and instability, among other potential problems in the network. Thus, deployment locations, configurations, and other factors employed to manage networks can often interfere with obtaining suitable network auditing results using only active vulnerability scanners. As such, existing systems that tend to rely entirely on active vulnerability scanners typically prevent the active vulnerability scanner from obtaining comprehensive information that describes important settings, configurations, or other information associated with the network because many active vulnerability scanners only audit a network state at a particular point in time, except that suitably managing network security often requires further insight relating to real-time activity that occurs in the network.

For example, in many instances, certain hosts or devices may participate in sessions occurring on the network, yet the limitations described above can prevent active vulnerability scanners alone from suitably auditing the hosts or devices. As such, various existing network security systems employ one or more passive vulnerability scanners in combination with active vulnerability scanners to analyze traffic traveling across the network, which may supplement the information obtained from the active vulnerability scanners. However, even when employing passive vulnerability scanners in combination with active vulnerability scanners, the amount of data returned by the active vulnerability scanners and the passive vulnerability scanners can often be quite substantial, which can lead to difficulties in administrating the potentially large number of vulnerabilities and assets in the network because many network topologies may include hundreds, thousands, or even larger numbers of nodes, whereby suitably representing the network topologies in a manner that provides visibility into the network can be unwieldy. Furthermore, passive vulnerability scanners (like active vulnerability scanners) may have coverage gaps in that network traffic may not always include all data relevant to discovering network vulnerabilities (e.g., a passive vulnerability scanner may observe traffic that includes SSL data but be unable to determine what SSL version was used in the observed traffic, which may be relevant to determining whether the network may be susceptible to compromise due to supporting an SSL version having known vulnerabilities).

Although desktops, laptops, servers, applications, and other assets in a network can be configured to generate events or other log data that describes activity performed therewith, which may supplement data that any active vulnerability scanners and/or passive vulnerability scanners produce, existing solutions to correlate network events or log data tend to suffer from various limitations that interfere with detecting network vulnerabilities from such events or log data alone. Instead, to the extent that existing event and log correlation solutions may support vulnerability management, existing solutions tend to focus on whether the correlated events and/or log data describe activity that may be targeting or otherwise attempting to exploit known vulnerabilities that were previously detected using some other mechanism (e.g., an active and/or passive vulnerability scanning solution). Furthermore, even if an existing event or log data correlation solution could support vulnerability detection, adding such support would likely require vulnerability research teams and developers to expend substantial effort to rewrite, reformat, or otherwise redesign the code, data structures, and other information that correspond to known vulnerability data in a manner that the existing solution can digest. Accordingly, existing solutions to correlate network log data or other event information tend to have various limitations and drawbacks that interfere with the ability to suitably discover vulnerabilities and assets from such log data or event information and thereby complement active and/or passive vulnerability scans or otherwise provide alternate mechanisms that may be used to discover network assets and vulnerabilities from various network sources.

SUMMARY

The following presents a simplified summary relating to various aspects, embodiments, and/or implementations that may be used to discover network vulnerabilities and assets from correlated log data in order to provide a basic understanding relating to such aspects, embodiments, and/or implementations. As such, the following summary should not be considered an extensive overview covering all contemplated aspects, embodiments, and/or implementations, nor should this summary be regarded to identify key or critical elements corresponding to all aspects, embodiments, and/or implementations described herein or delineate the scope of any particular aspect, embodiment, and/or implementation. Accordingly, the following summary has the sole purpose to present certain concepts relating to one or more aspects, embodiments, and/or implementations relating to the mechanisms disclosed herein that may be used to discover network vulnerabilities and assets from correlated log data in a simplified form to precede the more detailed description below.

According to one exemplary aspect, a system that may be used to correlate log data to discover network vulnerabilities and assets may generally include, among other things, a log correlation engine that can receive and correlate logs that include events from various sources distributed across a network to detect abuses, statistical anomalies, compromise, compliance violations, and other information that may have relevance to a security posture or state associated with the network. For example, in one implementation, logs may generally arrive at the log correlation engine from various sources and include events that describe network activities, operating system activities, file modifications, USB device insertions, intrusion detection attempts, application executions, authentication attempts, and various other activities that may occur in a network. Accordingly, in one implementation, the log correlation engine may generally aggregate, normalize, and correlate the events in the logs received from the various sources distributed across the network to automatically detect statistical anomalies, identify intrusion events or other attempts to exploit previously discovered vulnerabilities in the network, or otherwise provide visibility into what may be happening in the network at any particular time. Furthermore, as will be described in further detail herein, the log correlation engine may be configured to cross-reference or otherwise leverage existing vulnerability data to automatically discover new vulnerabilities in the network in response to determining that one or more correlated logs include content that indicates a previously unknown vulnerability in the network. For example, in one implementation, the log correlation engine may discover a new vulnerability in response to the correlated logs including content (e.g., a text string) that matches a regular expression associated with a known vulnerability and then cross-reference existing vulnerability data that contain information about the vulnerability to generate a report indicating that the new vulnerability was discovered.

According to one exemplary aspect, a system for correlating log data to discover vulnerable network assets may comprise a log correlation engine having one or more processors configured to receive one or more logs that contain events describing observed activity in a network, determine that the one or more logs contain at least one event that matches a regular expression in at least one correlation rule associated with the log correlation engine that indicates a vulnerability (e.g., when the at least one event contains a text string that matches the regular expression in the at least one correlation rule), obtain information about the indicated vulnerability from at least one data source cross-referenced in the at least one correlation rule, and generate a report that the indicated vulnerability was discovered in the network, wherein the report includes the information about the indicated vulnerability obtained from the at least one data source cross-referenced in the at least one correlation rule. Furthermore, in one implementation, the report may further include a host identifier and a port identifier associated with the indicated vulnerability and/or one or more variable references that specify dynamic content associated with the indicated vulnerability. In one implementation, the data source cross-referenced in the at least one correlation rule may comprise an identifier associated with vulnerability data that one or more passive scanners use to detect the indicated vulnerability, wherein the log correlation engine may be further configured to obtain the information about the indicated vulnerability from the cross-referenced data source through a backend distribution process that constructs an archive containing the information about the indicated vulnerability and communicate over a port associated with the one or more passive scanners to configure the log correlation engine as a passive scanner. Additionally, the one or more processors associated with the log correlation engine may be further configured to determine that the one or more logs contain at least one event associated with an Internet Protocol (IP) address internal to the network and report that a host associated with the internal IP address was discovered in the network if the internal IP address has not already been discovered in the network (e.g., if the IP address falls within a first range that indicates IP addresses internal to the network and does not fall within a second range that indicates exceptions to the IP addresses internal to the network). The system may comprise a primary log correlation engine server configured to host a primary instance associated with the log correlation engine and one or more auxiliary log correlation engine servers configured to host one or more auxiliary instances associated with the log correlation engine, wherein the primary log correlation engine server may be further configured to receive the one or more logs that contain the events describing the observed activity in the network, monitor workloads across the one or more auxiliary log correlation engine servers, and automatically distribute the one or more received logs to balance a processing load among the primary log correlation engine server and the auxiliary log correlation engine servers.

According to one exemplary aspect, a method for correlating log data to discover vulnerable network assets may comprise receiving, at a log correlation engine, one or more logs that contain events describing observed activity in a network, determining that the one or more logs contain at least one event that matches a regular expression in at least one correlation rule associated with the log correlation engine that indicates a vulnerability (e.g., when the at least one event contains a text string that matches the regular expression in the at least one correlation rule), obtaining information about the indicated vulnerability from at least one data source cross-referenced in the at least one correlation rule, and generating a report that the indicated vulnerability was discovered in the network, wherein the report may include the information obtained from the at least one data source cross-referenced in the at least one correlation rule. Furthermore, in one implementation, the report may further include a host identifier and a port identifier associated with the indicated vulnerability and/or one or more variable references that specify dynamic content associated with the indicated vulnerability. In one implementation, the data source cross-referenced in the at least one correlation rule may comprise an identifier associated with vulnerability data that one or more passive scanners use to detect the indicated vulnerability, wherein the log correlation engine may obtain the information about the indicated vulnerability from the cross-referenced data source through a backend distribution process that constructs an archive containing the information about the indicated vulnerability and communicate over a port associated with the one or more passive scanners to configure the log correlation engine as a passive scanner. Additionally, the method may further comprise determining that the one or more logs contain at least one event associated with an Internet Protocol (IP) address internal to the network and reporting that a host associated with the internal IP address was discovered in the network if the internal IP address has not already been discovered in the network (e.g., if the IP address falls within a first range that indicates IP addresses internal to the network and does not fall within a second range that indicates exceptions to the IP addresses internal to the network).

According to one exemplary aspect, a computer-readable storage medium may have computer-executable instructions stored thereon for correlating log data to discover vulnerable network assets, wherein executing the computer-executable instructions a processor may cause the processor to receive, at a log correlation engine, one or more logs that contain events describing observed activity in a network, determine that the one or more logs contain at least one event that matches a regular expression in at least one correlation rule associated with the log correlation engine that indicates a vulnerability (e.g., when the at least one event contains a text string that matches the regular expression in the at least one correlation rule), obtain information about the indicated vulnerability from at least one data source cross-referenced in the at least one correlation rule, and generate a report that the indicated vulnerability was discovered in the network, wherein the report may include the information obtained from the at least one data source cross-referenced in the at least one correlation rule. Furthermore, in one implementation, the report may further include a host identifier and a port identifier associated with the indicated vulnerability and/or one or more variable references that specify dynamic content associated with the indicated vulnerability. In one implementation, the data source cross-referenced in the at least one correlation rule may comprise an identifier associated with vulnerability data that one or more passive scanners use to detect the indicated vulnerability, wherein the log correlation engine may obtain the information about the indicated vulnerability from the cross-referenced data source through a backend distribution process that constructs an archive containing the information about the indicated vulnerability and communicate over a port associated with the one or more passive scanners to configure the log correlation engine as a passive scanner. Additionally, the computer-executable instructions may further cause the processor to determine that the one or more logs contain at least one event associated with an Internet Protocol (IP) address internal to the network and report that a host associated with the internal IP address was discovered in the network if the internal IP address has not already been discovered in the network (e.g., if the IP address falls within a first range that indicates IP addresses internal to the network and does not fall within a second range that indicates exceptions to the IP addresses internal to the network).

Other objects and advantages associated with the aspects, implementations, and embodiments described herein for correlating log data to discover network vulnerabilities and assets will be apparent to those skilled in the pertinent art based on the accompanying drawings and the following detailed description.

DETAILED DESCRIPTION

Figure 1:
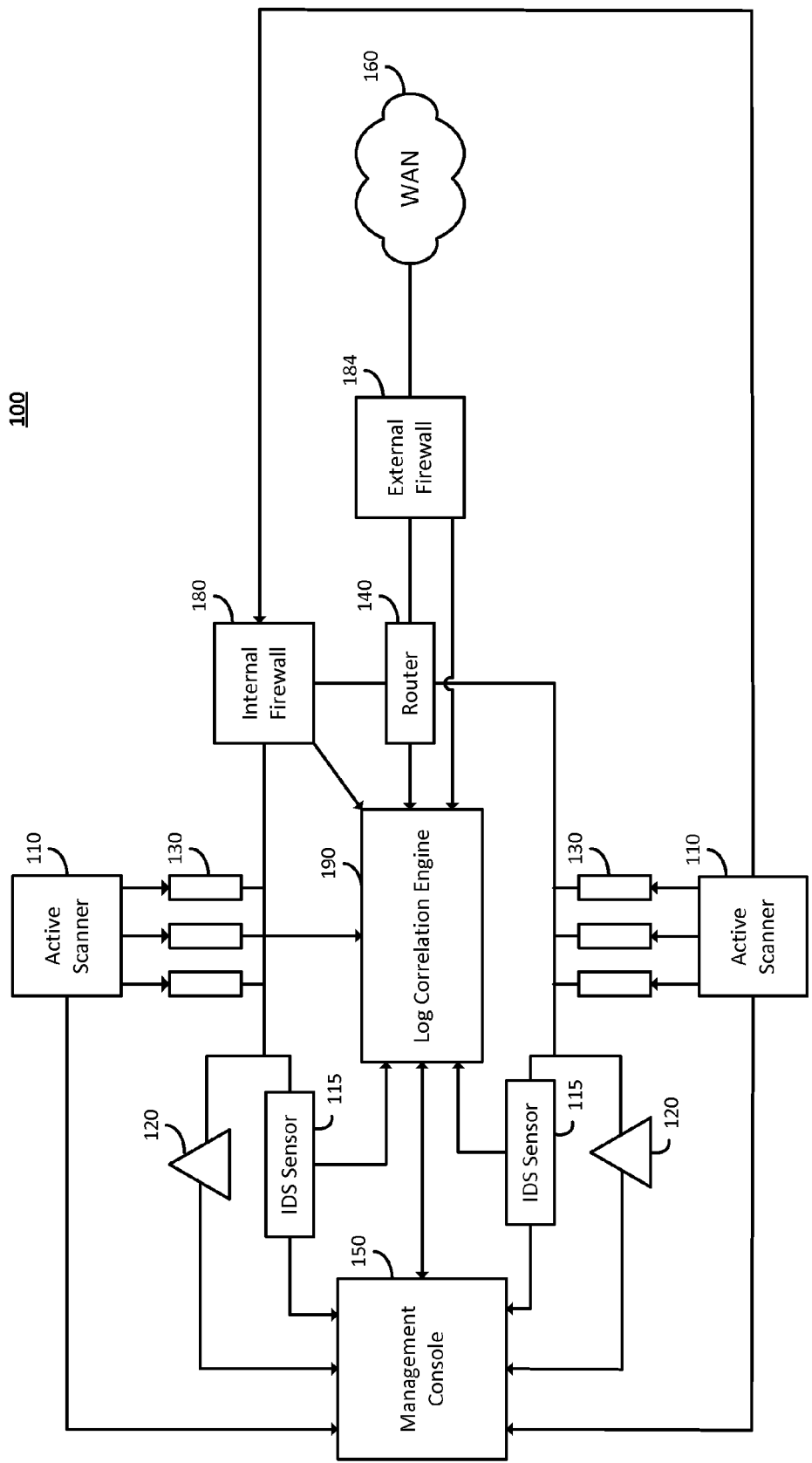
FIG. 1 illustrates an exemplary system that may be used to correlate log data to discover network vulnerabilities and assets, according to one exemplary aspect.

According to one exemplary aspect, FIG. 1 illustrates an exemplary system 100 that may be used to correlate log data to discover network vulnerabilities and assets. In particular, the system 100 shown in FIG. 1 may generally include, among other things, a log correlation engine 190 (e.g., the Tenable Log Correlation Engine, available from Tenable Network Security®), which may receive and correlate logs that include events from various sources distributed across a network to detect abuses, statistical anomalies, compromise, compliance violations, and other information that may have relevance to a security posture or state associated with the network. For example, in one implementation, logs may generally arrive at the log correlation engine 190 from various sources and include events that describe network activities, operating system activities, file modifications, USB device insertions, intrusion detection attempts, application executions, authentication attempts, and various other activities that may occur in a network. Accordingly, in one implementation, the log correlation engine 190 may generally aggregate, normalize, and correlate the events in the logs received from the various sources distributed across the network to automatically detect statistical anomalies, identify intrusion events or other attempts to exploit previously discovered vulnerabilities in the network, or otherwise provide visibility into what may be happening in the network at any particular time. Furthermore, as will be described in further detail herein, the log correlation engine 190 may be configured to cross-reference or otherwise leverage existing vulnerability data to automatically discover new vulnerabilities in the network in response to determining that one or more correlated logs include content that indicates a previously unknown vulnerability in the network. For example, in one implementation, the log correlation engine 190 may discover a new vulnerability in response to the correlated logs including content (e.g., a text string) that matches a regular expression associated with a known vulnerability and then cross-reference existing vulnerability data that contain information about the vulnerability to generate a report indicating that the new vulnerability was discovered.

The following description will generally detail how various components in the system 100 may operate to discover and report assets and vulnerabilities in the network, which may provide a background to aid in understanding how the log correlation engine 190 may discover and report assets and vulnerabilities in the network from analyzing log data. However, those skilled in the art will appreciate that the components and functions described in further detail below are exemplary only, in that the system 100 may be implemented in various ways to support the mechanisms that the log correlation engine 190 may use to discover and report assets and vulnerabilities in the network from log data that represents activities in the network.

In one implementation, the system 100 shown in FIG. 1 may include one or more active scanners 110 (e.g., Nessus vulnerability and configuration assessment products, available from Tenable Network Security®), which can communicate packets or other messages within the network to detect new or changed information describing various routers 140, internal firewalls 180, external firewalls 184, or other suitable hosts 130 in the network, wherein the hosts 130 may generally include servers, desktop computers, mobile devices, or any other suitable device in the network. For example, in one implementation, the active scanners 110 may perform credentialed audits or uncredentialed scans to scan certain routers 140, internal firewalls 180, external firewalls 184, or other hosts 130 in the network and obtain information that may then be analyzed to discover assets and identify potential vulnerabilities in the network. More particularly, in one implementation, the credentialed audits may include the active scanners 110 using suitable authentication technologies to log into and obtain local access to the routers 140, internal firewalls 180, external firewalls 184, or other hosts 130 in the network and perform any suitable operation that a local user could perform thereon without necessarily requiring a local agent. As such, the credentialed audits performed with the active scanners 110 may be used to obtain highly accurate host-based data that includes various client-side issues (e.g., missing patches, operating system settings, locally running services, etc.). On the other hand, the uncredentialed audits may generally include network-based scans that involve communicating packets or messages to the routers 140, internal firewalls 180, external firewalls 184, or other hosts 130 in the network and observing responses thereto in order to identify certain vulnerabilities (e.g., if a particular host 130 accepts spoofed packets, the active scanners 110 may determine that the host 130 exposes a vulnerability that can be exploited to close established connections).

In one implementation, the active scanners 110 may generally be distributed in locations across the network to reduce stress on the network. For example, the active scanners 110 may be distributed at different locations in the network in order to scan certain network portions in parallel and thereby substantially reduce the time needed to perform the active scans. Furthermore, in one implementation, one or more active scanners 110 may be distributed at locations that provide visibility into a remote network 160. For example, as shown in FIG. 1, one or more active scanners 110 may be distributed at a location in communication with a remote network 160, wherein the term "remote network" used herein may refer to a wide area network (WAN), the Internet, a partner network, or any other suitable external network 160. As such, references to "the network," "the internal network," and/or "the managed network" used herein may generally refer to the areas that the systems and methods described herein may be used to protect or otherwise manage, while the terms "remote network," "external network," "partner network," "Internet," and/or WAN may all be used interchangeably to suitably refer to one or more networks outside the internal network managed with the systems and methods described herein. Accordingly, in one implementation, limiting the portions in the network and/or the remote network 160 that the active scanners 110 are configured to interrogate, probe, or otherwise scan and having the active scanners 110 perform the scans in parallel may reduce the amount of time that the active scans consume because the active scanners 110 can be distributed closer to scanning targets (e.g., routers 140, internal firewalls 180, external firewalls 184, hosts 130, servers 130, devices 130, etc.). In particular, because the active scanners 110 may scan limited portions of the network rather than the entire network, and further because the parallel active scans may obtain information from the different portions of the network, the overall time that the active scans consume may substantially correspond to the time associated with one active scan.

As such, the active scanners 110 may generally scan respective portions in the network to obtain information describing vulnerabilities and assets in the respective network portions. In particular, as described in "Unified Security Monitoring (USM): Real-Time Situational Awareness of Network Vulnerabilities, Events and Configurations," the contents of which are hereby incorporated by reference in their entirety, the active scanners 110 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, in one implementation, the active scanners 110 may perform the various active probes to obtain a snapshot that describes assets actively running in the network at a particular point in time (e.g., actively running routers 140, internal firewalls 180, external firewalls 184, hosts 130, servers 130, devices 130, etc.), wherein the snapshot may further include any exposures, associations, or other relationships that the actively running assets have to vulnerabilities that are identified or otherwise discovered in the network (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network. In one implementation, in response to obtaining the snapshot of the network, the active scanners 110 may then report the information describing the snapshot to a management console 150, which may use the information provided by the active scanners 110 to remediate and otherwise manage the vulnerabilities and assets in the network.

Additionally, in one implementation, the system 100 may further include one or more passive scanners 120 (e.g., the Tenable Passive Vulnerability Scanner, also available from Tenable Network Security®), which may observe traffic traveling in the network to further identify potential vulnerabilities in the network and detect activity that may potentially target or otherwise attempt to exploit the vulnerabilities that the active scanners 110 and/or the passive scanners 120 previously identified. In particular, whereas the active scanners 110 may obtain local access to routers 140, internal firewalls 180, external firewalls 184, and other suitable hosts 130 in the network (e.g., in a credentialed audit) and/or communicate various packets or other messages within the network to illicit responses therefrom (e.g., in an uncredentialed scan), the passive scanners 120 may generally observe or "sniff" various packets or other messages in traffic traversing the network to passively scan the network or otherwise monitor traffic in the network. For example, in one implementation, the passive scanners 120 may reconstruct one or more sessions in the network from information contained in the sniffed traffic, wherein the reconstructed network sessions may then be used in combination with the information obtained with the active scanners 110 to build a model or topology describing assets and vulnerabilities discovered the network, wherein the model or topology built from the information obtained with the active scanners 110 and the passive scanners 120 may describe any assets actively running in the network or discovered through participating in one or more network sessions, any services or client-side software actively running or supported on the assets, trust relationships associated with the various assets discovered in the network, and vulnerabilities associated with the discovered assets or traffic involving the discovered assets, among other things. In one implementation, the passive scanners 120 may further apply various signatures to the information in the observed traffic to identify network vulnerabilities and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to any new or changed information in the network.

In one implementation, as noted above, the passive scanners 120 may generally observe the traffic traveling across the network to reconstruct one or more sessions occurring in the network, which may then be analyzed to identify potential vulnerabilities in the network and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network). Accordingly, the passive scanners 120 may monitor the network in real-time to detect any potential vulnerabilities in the network in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network from the encrypted and interactive network sessions (e.g., a new e-commerce server 130 may be identified in response to the passive scanners 120 observing an encrypted and/or interactive session between a certain host located in a remote network 160 and a certain port on the server 130 that processes electronic transactions). In one implementation, the passive scanners 120 may observe as many sessions in the network as possible to provide optimal visibility into the network and the activity that occurs in the network. For example, in one implementation, the passive scanners 120 may be deployed at a router 140 (e.g., a network hub, a spanned switch port, a network tap, a network choke point, etc.) on a dial up node 130, at a server farm 130, behind an internal firewall 180 or external firewall 184, or any other suitable location that enables the passive scanners 120 to observe incoming and outgoing traffic in the network. Accordingly, the passive scanners 120 may generally be deployed on any suitable host 130 in the network that runs a suitable operating system (e.g., a Red Hat Linux or FreeBSD open source operating system, a UNIX, Windows, or Mac OS X operating system, etc.) that enables the passive scanners 120 to observe incoming and outgoing traffic in the network.

Furthermore, in one implementation, the passive scanners 120 may be distributed at various locations in the network to monitor traffic traveling across the network, traffic originating within the managed network and directed to the remote network 160, and traffic originating within the remote network 160 and directed to the managed network, thereby supplementing the information obtained with the active scanners 110. For example, the passive scanners 120 may monitor the traffic traveling across the network and the traffic originating from and/or directed to the remote network 160 to identify vulnerabilities, assets, or other information that the active scanners 110 may be unable to obtain because the traffic may be associated with previously inactive assets that later participate in sessions on the network. Additionally, in one implementation, the passive scanners 120 may be deployed directly within or adjacent to an intrusion detection system sensor 115, which may provide the passive scanners 120 with visibility relating to intrusion events or other security exceptions that the intrusion detection system sensor 115 identifies. In one implementation, the intrusion detection system may generally include an open source network intrusion prevention and detection system (e.g., Snort), a packet analyzer, or any other system that having a suitable sensor 115 that can detect and prevent intrusion or other security events in the network.

Accordingly, the passive scanners 120 may generally sniff one or more packets or other messages in the traffic traveling across, originating from, or directed to the network to discover routers 140, internal firewalls 180, external firewalls 184, hosts 130, or other assets in addition to open ports, client/server applications, vulnerabilities, or other activity associated therewith. In addition, the passive scanners 120 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network. In one implementation, the information that the passive scanners 120 obtains from sniffing the traffic traveling across, originating from, or directed to the network may therefore provide a real-time record describing activities that occur in the network, whereby the passive scanners 120 may behave like security motion detectors on the network, mapping and monitoring any vulnerabilities, assets, services, applications, sensitive data, and other information that appear or change in the network. In one implementation, the passive scanners 120 may then report the information obtained from the traffic monitored in the network to the management console 150, which may use the information provided by the passive scanners 120 in combination with the information reported from the active scanners 110 to remediate and otherwise manage the network.

In one implementation, as noted above, the system 100 shown in FIG. 1 may include a management console 150 (e.g., Tenable SecurityCenter™, available from Tenable Network Security®), which may provide a unified security monitoring solution to manage the various assets and vulnerabilities discovered in the network. In particular, the management console 150 may aggregate the information obtained from the active scanners 110 and the passive scanners 120 to build or update the model or topology associated with the network, which may generally include real-time information describing various vulnerabilities, applied or missing patches, intrusion events, anomalies, event logs, file integrity audits, configuration audits, or any other information that may be relevant to managing the vulnerabilities and assets in the network. As such, the management console 150 may provide a unified interface to mitigate and manage governance, risk, and compliance across the network. In one implementation, further detail relating to interaction between the management console 150, the active scanners 110, and the passive scanners 120 may be found in "Unified Security Monitoring (USM): Real-Time Situational Awareness of Network Vulnerabilities, Events and Configurations," the contents of which were incorporated by reference above.

In one implementation, the log correlation engine 190 may generally receive logs containing one or more events from various sources distributed across the network (e.g., logs describing network activity, operating system events, file modification events, USB device insertion events, etc.). In particular, the logs received at the log correlation engine 190 may include events generated by one or more of the internal firewalls 180, external firewalls 184, routers 140, or other hosts 130 in the network in addition to events generated by one or more operating systems, applications, or other sources in the network, wherein the log correlation engine 190 may normalize the events contained in the various logs received from the sources distributed across the network, which may be analyzed and correlated to automatically detect statistical anomalies, detect events that may be targeting or otherwise exploiting vulnerabilities and/or assets in the network, identify data meeting certain criteria, or otherwise manage vulnerabilities and assets across the network. Furthermore, in one implementation, the log correlation engine 290 may filter the events contained in the logs to limit the information that the log correlation engine 190 normalizes, analyzes, and correlates to information that has relevance to a certain security posture (e.g., rather than processing thousands or millions of events generated across the network, which could take a substantial amount of time, the log correlation engine 190 may identify event subsets that relate to particular intrusion events, attacker network addresses, assets having vulnerabilities that the intrusion events and/or the attacker network addresses target, etc.). Alternatively (or additionally), the log correlation engine 190 may persistently save the events contained in all the logs to comply with regulatory requirements providing that all logs must be stored for a certain time period (e.g., saving the events in every log to comply with the regulatory requirements while only normalizing, analyzing, and correlating the events in certain logs that have relevance to the managed security posture). As such, the log correlation engine 190 may aggregate, normalize, analyze, and correlate information received in various event logs, snapshots obtained by the active scanners 110, and/or the network activity observed with the passive scanners 120 to comprehensively monitor, remediate, and otherwise manage vulnerabilities and assets in the network. Additionally, in one implementation, the log correlation engine 190 may report information relating to the information received and analyzed therein to the management console 150, which may use the information provided by the log correlation engine 190 in combination with the information provided by the passive scanners 120 and the active scanners 110 to remediate or otherwise manage assets and vulnerabilities discovered in the network.

In one implementation, as noted above and as will be described in further detail herein, the logs that are received, aggregated, and correlated with the log correlation engine 190 may include events that include information describing the network snapshot obtained with the active scanners 110 and/or the network traffic observed with the passive scanners 120 in addition to logs that include events relating to firewall activities, operating system activities, file modifications, USB device insertions, application executions, authentication attempts, and various other activities that may occur in a network. For example, in one implementation, the log correlation engine 190 may receive one or more NetFlow logs that include records describing the network traffic observed with the passive scanners 120, wherein the NetFlow log records may include substantial detail about traffic in a particular flow or session that the passive scanners 120 observe in the network (e.g., source and destination IP addresses, source and destination port numbers, Internet Control Message Protocol (ICMP) types and codes, IP protocols, Type of Service (ToS) values, start and finish timestamps, observed byte and packet quantities, an input interface index, an output interface index (or zero if a packet was dropped), source and destination IP masks, etc.). Accordingly, the log correlation engine 190 may have visibility into substantially the same network traffic information that the passive scanners 120 observe (i.e., via the records in the NetFlow logs) in addition to certain activities that occur in the network that may not necessarily be visible to the passive scanners 120 (e.g., application executions, authentication attempts, etc.). As such, the following description will detail various mechanisms that the log correlation engine 190 may use to discover assets and vulnerabilities in the network from the various logs aggregated therein, whereby the log correlation engine 190 may generally be configured to behave in a substantially similar manner to the passive scanners 120 to substantially replace or supplement the functionality provided therewith.

More particularly, to automatically discover assets in the network based on the aggregated logs, the log correlation engine 190 may generally utilize one or more specified ranges that define IP addresses considered "internal" to the network from an event perspective and one or more specified ranges that define exceptions to the internal IP address ranges. For example, in one implementation, the ranges that define the IP addresses considered internal to the network and the exceptions thereto may be specified according to IP address and network mask (or subnet mask) routing prefix combinations (e.g., 192.168.0.0/255.255.0.0 through 192.168.1.0/255.255.0.0) and/or IP address and Classless Inter-Domain Routing (CIDR) routing prefix combinations (e.g., 192.168.0.0/16 through 192.168.1.0/16). As such, in response to receiving a particular event log, the log correlation engine 190 may determine whether the source and destination IP addresses in the event log fall within the specified internal IP addresses and do not fall within the exceptions thereto. In one implementation, in response to determining that the source IP address and/or destination IP address appears within the internal network (and does not fall within the exceptions), the log correlation engine 190 may query the management console 150 to determine whether the relevant IP address appearing within the internal network has previously been discovered. Accordingly, if the IP address within the internal network was not previously discovered, the log correlation engine 190 may report the discovered IP address to the management console 150 and optionally generate a new host event to indicate that an asset corresponding thereto was discovered.

Furthermore, to automatically discover vulnerabilities in the network based on the aggregated logs, the log correlation engine 190 may generally leverage existing vulnerability data that the passive scanners 120 utilize to report discovered vulnerabilities, which may substantially minimize the effort and resources that are needed to develop vulnerability data that can be used to discover and report vulnerabilities. In particular, the log correlation engine 190 may be configured to cross-reference the existing vulnerability data that the passive scanners 120 utilize to report discovered vulnerabilities because the log correlation engine 190 may have visibility into substantially the same network traffic information that the passive scanners 120 observe (i.e., via the records in the NetFlow logs), in that the vulnerabilities that the log correlation engine 190 can discover may substantially overlap with the vulnerabilities that the passive scanners 120 can discover. Accordingly, cross-referencing the existing vulnerability data may substantially reduce or eliminate the need to have developers duplicate fields from the data that the passive scanners 120 use to discover and report vulnerabilities, whereby any future changes to the vulnerability data can be made in one file (e.g., the file that the passive scanners 120 use) and the changes may automatically be propagated to the log correlation engine 190 via the cross-referencing mechanisms described in further detail herein.

More particularly, in one implementation, the log correlation engine 190 may cross-reference various metadata fields in the existing vulnerability data associated with the passive scanners 120 that contain information about the vulnerabilities that the log correlation engine 190 can detect, while certain other fields in the existing vulnerability data that differ in a log context relative to a traffic sniffing context may be ignored (e.g., match statements, regular expressions, or other data that the passive scanners 120 use to actually detect vulnerabilities from sniffed packets within observed traffic). For example, in one implementation, the metadata fields in the existing vulnerability data associated with the passive scanners 120 that the log correlation engine 190 cross-references or otherwise leverages may include vulnerability names and families, vulnerability identifiers (e.g., identifiers that the active scanners 110, Bugtraq mailing list, Common Vulnerabilities and Exposures (CVE) dictionary, Open Source Vulnerability Database (OSVDB), and/or other sources use to represent vulnerabilities), vulnerability exploit data (e.g., whether Metasploit, Immunity Canvas, Core Impact, and/or other public exploit sources indicate that certain vulnerabilities have known exploits available), vulnerability descriptions, synopses, solutions, and risks, and vulnerability severities or characteristics (e.g., a Common Vulnerability Scoring System (CVSS) base score, a CVSS temporal score that can change over time based on an exploit becoming available, how easily the vulnerability can be remediated, confidence relating to whether the vulnerability has been confirmed or corroborated, etc.).

Furthermore, in one implementation, the log correlation engine 190 may be configured with one or more additional fields to augment existing correlation rules with mechanisms that can be used to detect vulnerabilities from any events that can potentially expose a vulnerability, wherein the additional fields may include one or more pairs to augment the existing correlation rules. For example, in one implementation, the correlation rules that the log correlation engine 190 uses to analyze events from which a vulnerability can be detected may be augmented to include a vulnerability regular expression that matches the event to indicate a vulnerability and an identifier that cross-references the existing vulnerability data associated with the passive scanners 120 that contain the metadata fields with the information about the vulnerability. In one implementation, the information contained in the existing vulnerability data associated with the cross-reference identifier may be provided to the log correlation engine 190 within a suitable data feed through a backend distribution process that may construct an archive containing the metadata fields that the augmented correlation rules cross-reference to obtain the information about the vulnerabilities discovered from the events that match certain vulnerability regular expressions in the augmented correlation rules. Furthermore, because the log correlation engine 190 can be configured to ignore unrecognized metadata fields, the augmented correlation rules may be backwards compatible with prior log correlation engine 190 versions that may not support vulnerability discovery.

In one implementation, to demonstrate how the log correlation engine 190 may support vulnerability discovery, an exemplary and common vulnerability type that may be discovered through the augmented correlation rules described above may include an out-of-date version check relating to an Opera web browser running on a particular host 130 in the network. For example, the log correlation engine 190 may apply the following Web_GET_Misc correlation rule to capture a log that includes content to indicate a vulnerability associated with an out-of-date Opera web browser version:

TABLE 1

Exemplary Log Correlation Engine Vulnerability Detection Rule

Identifier: 4089 (Outdated Opera web browser version)
    Name: This web server logged a W3C entry for a GET request.
    Match: GET /
additional match statements removed for brevity
Regex: [ ^ ]+ [ ^ ]+ ([0-9]+\.[0-9]+\.[0-9]+\.[0-9]+) .+
([0-9]+\.[0-9]+\.[0-9]+\.[0-9]+) GET .* − [0-9]+ [0-9]+ [0-9]+ [0-9]+ .*

Accordingly, in response to receiving a log that contains the following event, the log correlation engine 190 may discover a vulnerability that corresponds to an out-of-date Opera web browser version, with the substring that indicates the vulnerability highlighted:

TABLE 2

Exemplary Log Indicating Web Browser Vulnerability 172.25.210.95 - - [26/Nov/2012:07:16:27 -0500] "GET /cgi.nessus.org/cve.php.3?cve=CVE-2012-
2733&__utma=96148739.119711473.1353931961.1353931961.1353931961.1&__utmb=96148739.1.10.1353931
961&__utmc=96148739&__utmx=-

TABLE 2-continued

Exemplary Log Indicating Web Browser Vulnerability

&__utmz=96148739.1353931961.1.1.utmcsr=(direct)|utmccn=(direct)|utmcmd=(none)&__utmv=-
&__utmk=263688452 HTTP/1.1" 302 1 "http://www.tenable.com/plugins/index.php?view=single&id=62987"
"Opera/9.80 (Windows NT 6.1; WOW64) Presto/2.12.388 Version/12.11"

In one implementation, in response to receiving the above log that contains the event indicating the vulnerability associated with the out-of-date Opera web browser version, the log correlation engine 190 may then cross-reference the following existing vulnerability data associated with the passive scanners 120 to obtain detailed information about the vulnerability:

TABLE 3

Exemplary Passive Scanner Data Relating to Web Browser Vulnerability

Identifier: 6618 (Outdated Opera web browser version)
noplugin: 3704
dependency: 3704
    Family: Web Clients
    Active Scanner Identifier: 62821
Bugtraq Identifier: 56407
    Name: Opera < 12.10 Multiple Vulnerabilities
Description: Synopsis :\n\nThe remote host has a web browser installed that is vulnerable by multiple vulnerabilities.
\n\n The remote host is running the Opera web browser. For your information, the observed version of Opera is : \n %L
\n\nVersions of Opera earlier than 12.10 are potentially affected by . . .
See also: http://www.opera.com/support/kb/view/1029
    CVSS Temporal: CVSS2#E:U/RL:OF/RC:C
Solution: Upgrade to Opera 12.10 or later.
Risk: HIGH
Match: >GET /
Match: ˆUser-Agent: Opera/
Regex: ˆUser-Agent: Opera/([0-8]\.[0-9\.]+|9\.(([0-9]|[0-7][0-9])[ˆ0-9]|80.*Version/([0-9]\.[0-9]+|1[01]\.[0-9]+|12\.0([0-9]|[ 0-9]))))

Accordingly, to configure the log correlation engine 190 to detect a vulnerable Opera web browser version (e.g., in response to the event shown in Table 2 including the substring that matches the regular expression in the vulnerability detection rule shown in Table 1, the log correlation engine 190 rule having identifier 4089 (e.g., as in Table 1) may be augmented to include the following two lines, and additional pairs could be similarly added to recognize other outdated web browsers:

pvsID=6618 vregex=<regular expression matching Opera versions earlier than 12.10>

In one implementation, in response to discovering a particular vulnerability using the augmented correlation rules described in further detail above, the log correlation engine 190 may have a default configuration that associates the discovered vulnerability with the source IP address contained in the event indicating the vulnerability (e.g., 172.25.210.95 in Table 2) and port 0. Alternatively (or additionally), two optional fields may be used to configure the log correlation engine 190 to specify different host information, wherein the optional fields may include a vulnHost field to indicate either a source or destination IP address keyword that indicates the corresponding field from the augmented correlation rule and a vulnPort field to indicate either a source or destination port keyword that indicates the corresponding field from the augmented correlation rule or a numeric port number value. Furthermore, in one implementation, the vregex parameter described above may be made optional to support extensibility and flexibility in authoring correlation rules that report vulnerabilities or other information indicated in the correlation rule without needing additional analysis. For example, in one implementation, a log-based operating system fingerprinting feature could be achieved through minimal informational data structures that correspond to each known operating system, wherein the following table shows an exemplary informational data structures that corresponds to Microsoft Windows Vista/2008 Server:

TABLE 4

Exemplary Fingerprinted Operating System Data Structure

Identifier: 60001
Description: The host could be fingerprinted as Microsoft Windows Vista/2008 Server
Risk: INFO In one implementation, the line pvsID=60001 could then simply be added to any correlation rules to any correlation rules that detect events that fingerprint a Microsoft Windows Vista/2008 Server operating system to identify the operating system running on hosts 130 associated with the events. Furthermore, in one implementation, the log correlation engine 190 may support additional extensibility to report information specific to individual vulnerabilities via a details field that allows dynamic content to be specified using one or more variable references to fields in the augmented correlation rules. In one implementation, the details field may include variable references to specify source and destination IP addresses, source and destination ports, communication protocols, sensor identifiers, event identifiers, type identifiers, time stamps, user identifiers, log identifiers, or any other suitable data that may be relevant to certain individual vulnerabilities. For example, to add variable references to enhance a basic open port data structure that may provide more information than the corresponding passive scanner 120 data structure that would otherwise be cross-referenced, the log correlation engine 190 may reference the following minimal open port data structure in response to detecting any suitable event that includes information to indicate an open port:

TABLE 5

Exemplary Open Port Data Structure

Identifier: 0
Description: Open Port
Risk: LOW

Accordingly, an Internet Information Services (IIS) File Transfer Protocol (FTP) library may be updated to record an open server port that corresponds to the above open port data structure as follows, wherein a user may then be able to see the activity associated with the open port when browsing vulnerabilities through the management console 150:

TABLE 6

Exemplary IIS FTP Open Port Record

Identifier: 16017
Name: The FTP service has reported a control channel has been opened.
Match: Control
Match: Opened
Match: —
Regex: ([0-9]+(\.[0-9]+){3}) \- ([0-9]+(\.[0-9]+){3}) 21 ControlChannelOpened
Log: event:FTP-ControlChannelOpened type:connection srcip:$1 dstip:$3 dstport:21 proto:6
Passive Scanner Identifier: 0
vulnHost: dstip
vulnPort: dstport
Details: The open port was observed with the following %event event: %log In one implementation, to integrate the log correlation engine 190 asset and vulnerability discovery mechanisms described above into the system 100, the log correlation engine 190 may be configured to report any discovered vulnerabilities and assets in a local file formatted according to how the active scanners 110 report information to the management console 150. As such, the data in the local file may be integrated with a vulnerability database maintained at the management console 150 after a file transfer. For example, in one implementation, the log correlation engine 190 may be configured to include a port corresponding to a proxy daemon associated with the passive scanners 120 to essentially configure the log correlation engine 190 as a passive scanner 120 and enable the management console 150 to connect to the log correlation engine 190 and pull information therefrom in the same manner that the management console 150 connects to and pulls information from the passive scanners 120. In another example, to provide a clearer distinction between the passive scanners 120 and the log correlation engine 190 while eliminate the extra proxy daemon from the log correlation engine 190, the management console 150 may be configured with native support to connect to and pull information from the log correlation engine 190, which may be achieved using an existing communication interface that the management console 150 and the log correlation engine 190 use to communicate with one another to perform a file transfer over a Secure Shell (SSH). In this case, the need to perform the additional configuration to include the port corresponding to the proxy daemon associated with the passive scanners 120 may be substantially eliminated. In another example, the log correlation engine 190 may implement a full communications interface that allows the log correlation engine 190 to transfer report data, configuration information, and other data to the management console 150 such that the log correlation engine 190 can push information to the management console 150 in addition to allowing the management console 150 to pull information from the log correlation engine 190.

Accordingly, in one implementation, the active scanners 110 may generally interrogate any suitable host 130 in the network to obtain information describing a snapshot of the network at any particular point in time, the passive scanners 120 may continuously or periodically observe traffic traveling in the network to identify vulnerabilities, assets, or other information that further describes the network, and the log correlation engine 190 may collect additional information to further discover the vulnerabilities, assets, or other information describing the network, while the management console 150 may provide a unified solution that aggregates the vulnerability and asset information obtained with the active scanners 110, the passive scanners 120, and the log correlation engine 190 to comprehensively manage governance, risk, and compliance across the network.

In one implementation, further detail relating to exemplary features associated with the systems shown in FIG. 1 may be provided, for example, in U.S. patent application Ser. No. 10/863,238, entitled "System and Method for Managing Network Vulnerability Analysis Systems," which issued as U.S. Pat. No. 7,926,113 on Apr. 12, 2011, U.S. patent application Ser. No. 11/016,761, entitled "System and Method for Scanning a Network," which issued as U.S. Pat. No. 7,761,918 on Jul. 20, 2010, U.S. patent application Ser. No. 11/313,710, entitled "System and Method for Managing Events," filed Dec. 22, 2005, U.S. patent application Ser. No. 12/693,803, entitled "System and Method for Correlating Network Identities and Addresses," filed Jan. 26, 2010, U.S. patent application Ser. No. 12/695,659, entitled "System and Method for Enabling Remote Registry Service Security Audits," which issued as U.S. Pat. No. 8,302,198 on Oct. 30, 2012, U.S. patent application Ser. No. 12/729,036, entitled "System and Method for Passively Identifying Encrypted and Interactive Network Sessions," filed Mar. 22, 2010, U.S. patent application Ser. No. 12/775,120, entitled "System and Method for Three-Dimensional Visualization of Vulnerability and Asset Data," filed May 6, 2010, U.S. patent application Ser. No. 13/403,108, entitled "System and Method for Using File Hashes to Track Data Leakage and Document Propagation in a Network," filed Feb. 23, 2012, U.S. patent application Ser. No. 13/653,834, entitled "System and Method for Identifying Exploitable Weak Points in a Network," filed Oct. 23, 2012, and U.S. patent application Ser. No. 13/692,200, entitled "System and Method for Strategic Anti-Malware Monitoring," filed Dec. 3, 2012, the contents of which are each hereby incorporated by reference in their entirety.

Figure 2:
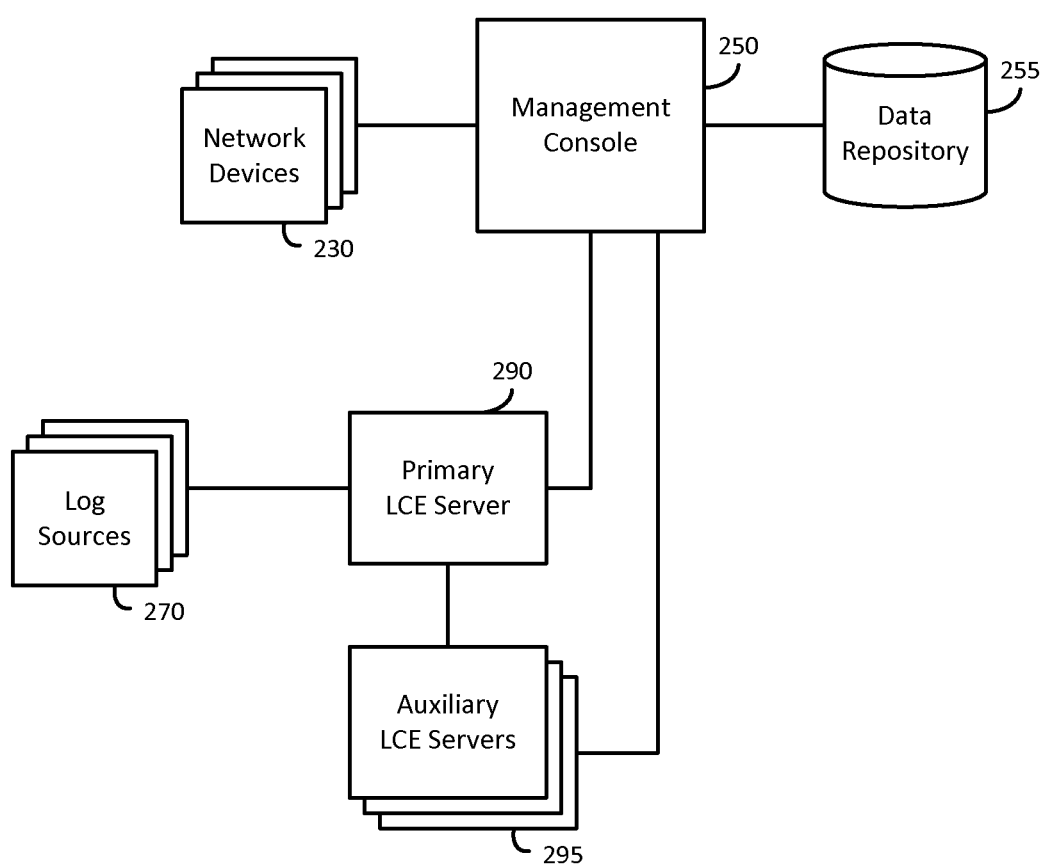
FIG. 2 illustrates another exemplary system that may be used to correlate log data to discover network vulnerabilities and assets, according to one exemplary aspect.

According to one exemplary aspect, FIG. 2 illustrates another exemplary system 200 that may be used to correlate log data to discover network vulnerabilities and assets. In general, the system 200 shown in FIG. 2 may include various components that are substantially similar to the system 100 shown in FIG. 1 described in further detail above. As such, for brevity and ease of description, various details relating to certain components in the system 200 shown in FIG. 2 may be omitted to the extent that the same or substantially similar details have already been provided above in relation to FIG. 1.

In one implementation, the system 200 shown in FIG. 2 may generally comprise a high-performance configuration to support the log correlation engine vulnerability and asset discovery features described in further detail above with reference to FIG. 1. In particular, industry standards generally measure performance associated with Security Information and Event Management (SIEM) solutions according to Events-Per-Second (EPS), which measures the rate at which the log correlation engine may process events and generate relevant information (e.g., relating to discovered vulnerabilities and assets). Among other factors, achieving a high EPS may depend on server hardware, network bandwidth and architecture, storage models, load distribution, and the ability to tune the events to be collected and processed. To that end, the system 200 shown in FIG. 2 may include a "smart" load balanced architecture in which multiple log correlation engine servers, including a primary log correlation engine server 290 and one or more auxiliary log correlation engine servers 295, may be configured to maximize throughput and reliability. For example, in one implementation, the primary log correlation engine server 290 may monitor workloads across the one or more auxiliary log correlation engine servers 295 and automatically route data to the appropriate system that has the lightest processing load based on queuing algorithms that advantageously leverage the full processing capacity associated with the primary log correlation engine server 290 and the auxiliary log correlation engine servers 295.

Accordingly, in one implementation, the system 200 shown in FIG. 2 may generally direct all log sources 270 to the primary log correlation engine server 290, wherein the log sources 270 may include one or more passive scanners, firewalls, web servers, Syslog event sources, intrusion detection sensors, operating systems, databases, or any other suitable source 270 that can generate logs that contain events that the log correlation engine can process. The primary log correlation engine server 290 may therefore perform distributed log processing in combination with the auxiliary log correlation engine servers 295 based on load, disk usage, and other processing resources available in the load balanced configuration. Furthermore, the management console 250 may receive information relating to various network devices 230 or other assets in the network, which may be stored in one or more suitable data repositories 255 and provided to the primary log correlation engine server 290 and the auxiliary log correlation engine servers 295 and used to perform the log correlation mechanisms described above. To that end, the primary log correlation engine server 290 and the auxiliary log correlation engine servers 295 may be configured to query the management console 150 to retrieve events because each log correlation engine server instance may be configured to only store the events processed therein and the primary log correlation engine server 290 and the management console 250 may need visibility into all the auxiliary log correlation engine servers 295 in order to properly display and search events across all log correlation engine servers.

In one implementation, further detail relating to the configuration and functionality associated with the load balanced log correlation engine server configuration shown in FIG. 2 may be provided in "Log Correlation Engine 4.0 High Performance Configuration Guide," the contents of which are hereby incorporated by reference in their entirety.

Figure 3:
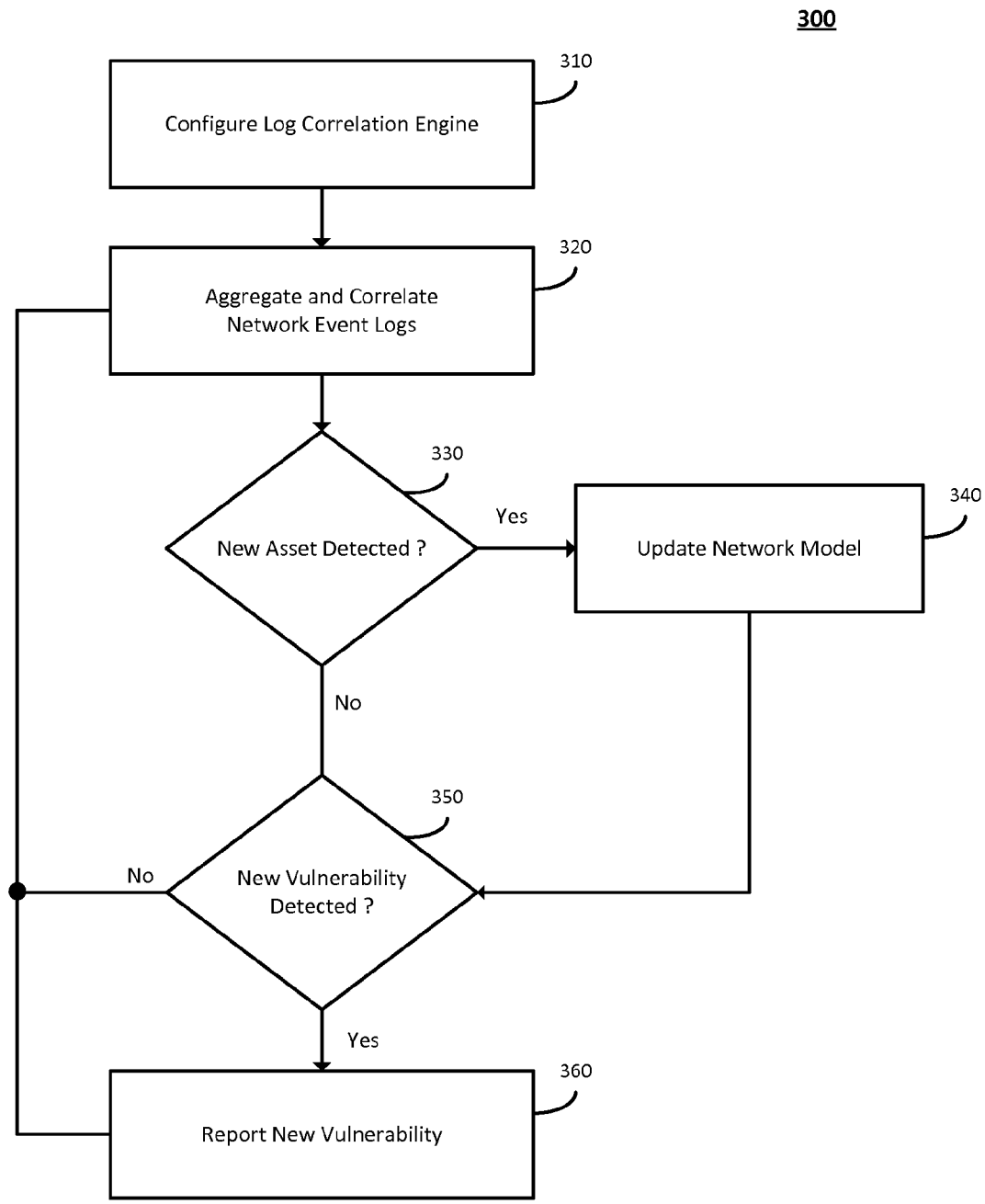
FIG. 3 illustrates an exemplary method that a log correlation engine may execute to discover and report network vulnerabilities and assets, according to one exemplary aspect.

According to one exemplary aspect, FIG. 3 illustrates an exemplary method 300 that a log correlation engine may execute to discover and report network vulnerabilities and assets. In particular, the method 300 shown in FIG. 3 may initially configure the log correlation engine at block 310 in order to integrate the asset and vulnerability discovery mechanisms performed therewith with a management console. In one implementation, the log correlation engine may be configured at block 310 to report any discovered vulnerabilities and assets in a local file formatted according to how one or more active scanners otherwise report information to the management console, whereby the data in the local file may be integrated with a vulnerability database maintained at the management console after a file transfer. For example, in one implementation, the log correlation engine may be configured at block 310 to include a port corresponding to a passive scanner proxy daemon to essentially configure the log correlation engine as a passive scanner and enable the management console to connect to the log correlation engine and pull information therefrom in the same manner that the management console would use to connect to and pull information from a passive scanner. In another example, to provide a clearer distinction between a passive scanner and the log correlation engine while eliminate the extra passive scanner proxy daemon from the log correlation engine, block 310 may configure the management console with native support to connect to and pull information from the log correlation engine, which may be achieved using an existing communication interface that the management console and the log correlation engine use to communicate with one another to perform a file transfer over SSH. In this case, the need to perform the additional configuration to include the port corresponding to the passive scanner proxy daemon may be substantially eliminated. In another example, block 310 may configure the log correlation engine with a full communications interface that allows the log correlation engine to transfer report data, configuration information, and other data to the management console such that the log correlation engine can push information to the management console in addition to allowing the management console to pull information from the log correlation engine.

In one implementation, at block 320, the configured log correlation engine may then aggregate and collect logs that include events from various sources distributed across a network to detect abuses, statistical anomalies, compromise, compliance violations, and other information that may have relevance to a security posture or state associated with the network or otherwise provide visibility into what may be happening in the network at any particular time. For example, in one implementation, logs may generally arrive at the log correlation engine from various sources and include events that describe network activities, operating system activities, file modifications, USB device insertions, intrusion detection attempts, application executions, authentication attempts, and various other activities that may occur in a network. In particular, the logs that are aggregated and collected at block 320 may include events generated by one or more internal firewalls, external firewalls, routers, or other hosts in the network in addition to events generated by one or more operating systems, applications, or other sources in the network. Furthermore, the logs that are aggregated and correlated at block 320 may include events that describe network snapshots obtained with the active scanners and/or network traffic observed with the passive scanners. For example, in one implementation, the log correlation engine may receive one or more NetFlow logs that include records describing the network traffic observed with the passive scanners, wherein the NetFlow log records may include substantial detail about traffic in a particular flow or session that the passive scanners observe in the network (e.g., source and destination IP addresses, source and destination port numbers, Internet Control Message Protocol (ICMP) types and codes, IP protocols, Type of Service (ToS) values, start and finish timestamps, observed byte and packet quantities, an input interface index, an output interface index (or zero if a packet was dropped), source and destination IP masks, etc.). Accordingly, the logs that are aggregated and collected at block 320 may provide the log correlation engine with visibility into substantially the same network traffic information that the passive scanners observe (i.e., via the records in the NetFlow logs) in addition to certain activities that occur in the network that may not necessarily be visible to the passive scanners (e.g., application executions, authentication attempts, etc.). As such, the log correlation engine may then discover assets and vulnerabilities in the network from the various logs aggregated at block 320, whereby the log correlation engine may generally be configured to behave in a substantially similar manner to the passive scanners to substantially replace or supplement the functionality provided therewith.

More particularly, to automatically discover assets in the network based on the aggregated logs, the log correlation engine may generally utilize one or more specified ranges that define IP addresses considered internal to the network from an event perspective and one or more specified ranges that define exceptions to the internal IP address ranges. For example, in one implementation, the ranges that define the IP addresses considered internal to the network and the exceptions thereto may be specified according to IP address and network mask (or subnet mask) routing prefix combinations and/or IP address and CIDR routing prefix combinations. As such, in response to receiving a particular event log at block 320, the log correlation engine may determine whether the source and destination IP addresses in the event log fall within the specified internal IP addresses and do not fall within the exceptions thereto. In one implementation, in response to determining that the source IP address and/or destination IP address appears within the internal network (and does not fall within the exceptions), the log correlation engine may query the management console at block 330 to determine whether the relevant IP address appearing within the internal network has previously been discovered. Accordingly, if the IP address within the internal network was not previously discovered, the log correlation engine may report the discovered IP address to the management console at block 340 to update the network model and optionally generate a new host event to indicate that an asset corresponding thereto was discovered.

Furthermore, to automatically discover vulnerabilities in the network based on the aggregated logs, the log correlation engine may generally leverage existing vulnerability data that the passive scanners utilize to report discovered vulnerabilities, which may substantially minimize the effort and resources that are needed to develop vulnerability data that can be used to discover and report vulnerabilities. In particular, the log correlation engine may be configured to cross-reference the existing vulnerability data that the passive scanners utilize to report discovered vulnerabilities because the log correlation engine may have visibility into substantially the same network traffic information that the passive scanners observe (i.e., via the records in the NetFlow logs), in that the vulnerabilities that the log correlation engine can discover may substantially overlap with the vulnerabilities that the passive scanners can discover. Accordingly, cross-referencing the existing vulnerability data may substantially reduce or eliminate the need to have developers duplicate fields from the data that the passive scanners use to discover and report vulnerabilities, whereby any future changes to the vulnerability data can be made in one file (e.g., the file that the passive scanners use) and the changes may automatically be propagated to the log correlation engine via the cross-referencing mechanisms described in further detail herein.

More particularly, in one implementation, the log correlation engine may cross-reference various metadata fields in the existing vulnerability data associated with the passive scanners that contain information about the vulnerabilities that the log correlation engine can detect, while certain other fields in the existing vulnerability data that differ in a log context relative to a traffic sniffing context may be ignored (e.g., match statements, regular expressions, or other data that the passive scanners use to actually detect vulnerabilities from sniffed packets within observed traffic). For example, in one implementation, the metadata fields in the existing vulnerability data associated with the passive scanners that the log correlation engine cross-references or otherwise leverages may include vulnerability names and families, vulnerability identifiers (e.g., identifiers that the active scanners, Bugtraq mailing list, CVE dictionary, OSVDB, and/or other sources use to represent vulnerabilities), vulnerability exploit data (e.g., whether Metasploit, Immunity Canvas, Core Impact, and/or other public exploit sources indicate that certain vulnerabilities have known exploits available), vulnerability descriptions, synopses, solutions, and risks, and vulnerability severities or characteristics (e.g., a CVSS base score, a CVSS temporal score that can change over time based on an exploit becoming available, how easily the vulnerability can be remediated, confidence relating to whether the vulnerability has been confirmed or corroborated, etc.).

Furthermore, in one implementation, the log correlation engine may be configured with one or more additional fields to augment existing correlation rules with mechanisms that can be used to detect vulnerabilities from any events that can potentially expose a vulnerability, wherein the additional fields may include one or more pairs to augment the existing correlation rules. For example, in one implementation, the correlation rules that the log correlation engine uses to analyze events from which a vulnerability can be detected may be augmented to include a vulnerability regular expression that matches the event to indicate a vulnerability and an identifier that cross-references the existing vulnerability data associated with the passive scanners that contain the metadata fields with the information about the vulnerability. In one implementation, the information contained in the existing vulnerability data associated with the cross-reference identifier may be provided to the log correlation engine within a suitable data feed through a backend distribution process that may construct an archive containing the metadata fields that the augmented correlation rules cross-reference to obtain the information about the vulnerabilities discovered from the events that match certain vulnerability regular expressions in the augmented correlation rules. Furthermore, because the log correlation engine can be configured to ignore unrecognized metadata fields, the augmented correlation rules may be backwards compatible with prior log correlation engine versions that may not support vulnerability discovery.

Accordingly, in response to receiving a log that contains an event matching the vulnerability regular expression in a particular augmented correlation rule, the log correlation engine may query the management console at block 350 to determine whether the vulnerability was previously discovered, wherein the log correlation engine may report the new vulnerability at block 360 if the vulnerability was not previously discovered. For example, in one implementation, the log correlation engine may cross-reference the existing vulnerability data associated with the passive scanners at block 360 to obtain detailed information about the vulnerability and report information associated therewith. In particular, the vulnerability data reported at block 360 may include the source IP address contained in the event indicating the vulnerability and port 0, or the vulnerability data reported at block 360 may alternatively (or additionally) specify either a source or destination IP address keyword that indicates the corresponding field from the augmented correlation rule and a either a source or destination port keyword that indicates the corresponding field from the augmented correlation rule or a numeric port number value. As such, the log correlation engine may generally cross-reference one or more suitable data feeds to obtain information about the vulnerability indicated in the event that matches the regular expression in the augmented correlation rule and thereby support vulnerability discovery through log analysis alone.

Implementations, embodiments, and aspects described herein may be made in hardware, firmware, software, or any suitable combination thereof. The implementations, embodiments, and aspects described herein may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence, and to the extent that the above disclosure describes certain exemplary aspects or implementations using singular forms (e.g., "a," "an," "the," etc.), such singular forms will be understood to further include plural forms unless clearly indicated otherwise. Those skilled in the pertinent art will further appreciate that the terms "comprises," "comprising," "includes," and/or "including" specify that the features, structures, or characteristics are present in the associated aspects and implementations but do not preclude the one or more other features, structures, or characteristics from being present or added to the associated aspects and implementations.

Furthermore, aspects and implementations may be described in the above disclosure as including particular features, structures, or characteristics, but it will be apparent that every aspect or implementation may or may not necessarily include the particular features, structures, or characteristics, and moreover, well-known features, structures, or characteristics associated with the aspects and implementations described above may be described in general terms or omitted to avoid obscuring the relevant details associated with the aspects and implementations described above. Further, where particular features, structures, or characteristics have been described in connection with a specific aspect or implementation, it will be understood that such features, structures, or characteristics may be included with other aspects or implementations, whether or not explicitly described. In addition, alternate aspects and implementations may be apparent to those skilled in the pertinent art based on the above disclosure, wherein such alternate aspects and implementations may be constructed and practiced without departing from the scope or spirit of the disclosure. Thus, various changes and modifications may be made to the preceding disclosure without departing from the scope or spirit of the disclosure, and the specification and drawings should therefore be regarded as exemplary only, with the protected scope determined solely by the appended claims.

What is claimed is:

1. A system for correlating log data to discover assets and vulnerabilities in a network, wherein the system comprises a log correlation engine having one or more processors configured to:
    receive one or more logs that contain one or more text strings associated with one or more events that describe observed activity on at least one internal host in the network;
    determine whether the one or more text strings contained in the one or more logs match a vulnerability regular expression in at least one correlation rule associated with the log correlation engine, wherein the vulnerability regular expression includes one or more match statements that are associated with a known vulnerability susceptible to compromise;
    discover a new vulnerability in the network that was previously unknown in response to the one or more text strings contained in the one or more logs matching the one or more match statements in the vulnerability regular expression that are associated with the known vulnerability susceptible to compromise, wherein the discovered new vulnerability indicates that the known vulnerability exists on the at least one internal host such that the at least one internal host is susceptible to compromise;
    obtain information about the new vulnerability discovered in the network from at least one data source cross-referenced in the at least one correlation rule, wherein the at least one correlation rule pairs the vulnerability regular expression associated with the known vulnerability susceptible to compromise with the cross-referenced at least one data source to indicate that the information about the new vulnerability is available from the at least one data source; and
    generate a report indicating that the new vulnerability was discovered in the network, wherein the report includes the information about the new vulnerability obtained from the at least one data source cross-referenced in the at least one correlation rule and further indicates that the network is susceptible to compromise due to the discovered new vulnerability indicating that the known vulnerability exists on the at least one internal host.

2. The system recited in claim 1, wherein the at least one data source cross-referenced in the at least one correlation rule comprises an identifier associated with vulnerability data that one or more passive scanners use to detect the known vulnerability susceptible to compromise.

3. The system recited in claim 2, wherein the one or more processors associated with the log correlation engine are further configured to obtain the information about the new vulnerability from the at least one cross-referenced data source through a backend distribution process configured to construct an archive containing one or more metadata fields that identify the at least one data source cross-referenced in the at least one correlation rule from which the information about the new vulnerability is obtained.

4. The system recited in claim 2, wherein the one or more processors associated with the log correlation engine are further configured to communicate over a port associated with the one or more passive scanners to configure the log correlation engine as a passive scanner.

5. The system recited in claim 1, wherein the one or more text strings contained in the one or more logs describe the observed activity on the at least one internal host that matched the vulnerability regular expression in the at least one correlation rule according to network traffic involving the at least one internal host.

6. The system recited in claim 5, wherein the one or more processors associated with the log correlation engine are further configured to:
  determine, from the one or more text strings that describe the network traffic involving the at least one internal host, a source network address associated with the at least one internal host and a source port number associated with the observed activity on the least one internal host that matched the vulnerability regular expression, wherein the report further includes the source network address associated with the at least one internal host on which the new vulnerability was discovered and the source port number associated with the observed activity that matched the vulnerability regular expression.

7. The system recited in claim 1, wherein the report further includes one or more variable references that specify dynamic content associated with the new vulnerability.

8. The system recited in claim 1, wherein the one or more processors associated with the log correlation engine are further configured to:
  discover that the at least one internal host is a new asset that was previously unknown in the network in response to the one or more events containing a source Internet Protocol (IP) address internal to the network that has not already been discovered in the network; and
  report that the new asset with the internal source IP address was discovered in the network to a management console configured to include the new asset in an updated model associated with the network.

9. The system recited in claim 8, wherein the one or more processors associated with the log correlation engine are further configured to determine that the source IP address is internal to the network based on the source IP address falling within a first range that indicates IP addresses internal to the network and not falling within a second range that indicates exceptions to the IP addresses internal to the network.

10. The system recited in claim 1, further comprising:
  a primary log correlation engine server configured to host a primary instance of the log correlation engine; and
  one or more auxiliary log correlation engine servers configured to host one or more auxiliary instances of the log correlation engine, wherein the primary log correlation engine server is further configured to receive the one or more logs that contain the one or more text strings associated with the one or more events describing the observed activity in the network, monitor workloads across the one or more auxiliary log correlation engine servers, and automatically distribute the one or more received logs to balance a processing load among the primary log correlation engine server and the one or more auxiliary log correlation engine servers.

11. A method for correlating log data to discover assets and vulnerabilities in a network, comprising:
  receiving, at a log correlation engine, one or more logs that contain one or more text strings associated with one or more events that describe observed activity on at least one internal host in the network;
  determining, at the log correlation engine, whether the one or more text strings contained in the one or more logs match a vulnerability regular expression in at least one correlation rule associated with the log correlation engine, wherein the vulnerability regular expression includes one or more match statements that are associated with a known vulnerability susceptible to compromise;
  discovering, at the log correlation engine, a new vulnerability in the network that was previously unknown in response to the one or more text strings contained in the one or more logs matching the one or more match statements in the vulnerability regular expression that are associated with the known vulnerability susceptible to compromise, wherein the discovered new vulnerability indicates that the known vulnerability exists on the at least one internal host such that the at least one internal host is susceptible to compromise;
  obtaining, at the log correlation engine, information about the new vulnerability discovered in the network from at least one data source cross-referenced in the at least one correlation rule, wherein the at least one correlation rule pairs the vulnerability regular expression associated with the known vulnerability susceptible to compromise with the cross-referenced at least one data source to indicate that the information about the new vulnerability is available from the at least one data source; and
  generating a report indicating that the new vulnerability was discovered in the network, wherein the report includes the information about the new vulnerability obtained from the at least one data source cross-referenced in the at least one correlation rule and further indicates that the network is susceptible to compromise due to the discovered new vulnerability indicating that the known vulnerability exists on the at least one internal host.

12. The method recited in claim 11, wherein the at least one data source cross-referenced in the at least one correlation rule comprises an identifier associated with vulnerability data that one or more passive scanners use to detect the known vulnerability susceptible to compromise.

13. The method recited in claim 12, wherein the log correlation engine obtains the information about the new vulnerability from the at least one cross-referenced data source through a backend distribution process configured to construct an archive containing one or more metadata fields that identify the at least one data source cross-referenced in the at least one correlation rule from which the information about the new vulnerability is obtained.

14. The method recited in claim 12, wherein the log correlation engine communicates over a port associated with the one or more passive scanners to configure the log correlation engine as a passive scanner.

15. The method recited in claim 11, wherein the one or more text strings contained in the one or more logs describe the observed activity on the at least one internal host that matched the vulnerability regular expression in the at least one correlation rule according to network traffic involving the at least one internal host.

16. The method recited in claim 15, further comprising: determining, from the one or more text strings that describe the network traffic involving the at least one internal host, a source network address associated with the at least one internal host and a source port number associated with the observed activity on the least one internal host that matched the vulnerability regular expression, wherein the report further includes the source network address associated with the at least one internal host on which the new vulnerability was discovered and the source port number associated with the observed activity that matched the vulnerability regular expression.

17. The method recited in claim 11, wherein the report further includes one or more variable references that specify dynamic content associated with the new vulnerability.

18. The method recited in claim 11, further comprising: discovering, at the log correlation engine, that the at least one internal host is a new asset that was previously unknown in the network in response to the one or more events containing a source Internet Protocol (IP) address internal to the network that has not already been discovered in the network; and
reporting that the new asset with the internal source IP address was discovered in the network to a management console configured to include the new asset in an updated model associated with the network.

19. The method recited in claim 18, wherein the log correlation engine determines that the source IP address is internal to the network based on the source IP address falling within a first range that indicates IP addresses internal to the network and not falling within a second range that indicates exceptions to the IP addresses internal to the network.

20. The method recited in claim 11, wherein a primary log correlation engine server hosts a primary instance of the log correlation engine and one or more auxiliary log correlation engine servers host one or more auxiliary instances of the log correlation engine, and wherein the method further comprises:
receiving the one or more logs that contain the one or more text strings associated with the one or more events describing the observed activity in the network at the primary log correlation engine server; and
monitoring, at the primary log correlation engine server, workloads across the one or more auxiliary log correlation engine servers, wherein the primary log correlation engine server automatically distributes the one or more received logs to balance a processing load among the primary log correlation engine server and the one or more auxiliary log correlation engine servers.

21. A non-transitory computer-readable storage medium having computer-executable instructions stored thereon for correlating log data to discover assets and vulnerabilities in a network, wherein executing the computer-executable instructions a processor causes the processor to:
receive one or more logs that contain one or more text strings associated with one or more events that describe observed activity on at least one internal host in the network;
determine whether the one or more text strings contained in the one or more logs match a vulnerability regular expression in at least one correlation rule associated with a log correlation engine, wherein the vulnerability regular expression includes one or more match statements that are associated with a known vulnerability susceptible to compromise;
discover a new vulnerability in the network that was previously unknown in response to the one or more text strings contained in the one or more logs matching the one or more match statements in the vulnerability regular expression that are associated with the known vulnerability susceptible to compromise, wherein the discovered new vulnerability indicates that the known vulnerability exists on the at least one internal host such that the at least one internal host is susceptible to compromise;
obtain information about the new vulnerability discovered in the network from at least one data source cross-referenced in the at least one correlation rule, wherein the at least one correlation rule pairs the vulnerability regular expression associated with the known vulnerability susceptible to compromise with the cross-referenced at least one data source to indicate that the information about the new vulnerability is available from the at least one data source; and
generate a report indicating that the new vulnerability was discovered in the network, wherein the report includes the information about the new vulnerability obtained from the at least one data source cross-referenced in the at least one correlation rule and further indicates that the network is susceptible to compromise due to the discovered new vulnerability indicating that the known vulnerability exists on the at least one internal host.

22. The non-transitory computer-readable storage medium recited in claim 21, wherein the at least one data source cross-referenced in the at least one correlation rule comprises an identifier associated with vulnerability data that one or more passive scanners use to detect the known vulnerability susceptible to compromise.

23. The non-transitory computer-readable storage medium recited in claim 22, wherein executing the computer-executable instructions the processor further causes the processor to obtain the information about the new vulnerability from the at least one cross-referenced data source through a backend distribution process configured to construct an archive containing one or more metadata fields that identify the at least one data source cross-referenced in the at least one correlation rule from which the information about the new vulnerability is obtained.

24. The non-transitory computer-readable storage medium recited in claim 22, wherein executing the computer-executable instructions the processor further causes the processor to communicate over a port associated with the one or more passive scanners to configure the log correlation engine as a passive scanner.

25. The non-transitory computer-readable storage medium recited in claim 21, wherein the one or more text strings contained in the one or more logs describe the observed activity on the at least one internal host that matched the vulnerability regular expression in the at least one correlation rule according to network traffic involving the at least one internal host.

26. The non-transitory computer-readable storage medium recited in claim 25, wherein executing the computer-executable instructions the processor further causes the processor to:
determine, from the one or more text strings that describe the network traffic involving the at least one internal host, a source network address associated with the at least one internal host and a source port number associated with the observed activity on the least one internal host that matched the vulnerability regular expression, wherein the report further includes the source network address associated with the at least one internal host on which the new vulnerability was discovered and the source port number associated with the observed activity that matched the vulnerability regular expression.

27. The non-transitory computer-readable storage medium recited in claim 21, wherein the report further includes one or more variable references that specify dynamic content associated with the new vulnerability.

28. The non-transitory computer-readable storage medium recited in claim 21, wherein executing the computer-executable instructions the processor further causes the processor to:
  discover that the at least one internal host is a new asset that was previously unknown in the network in response to the one or more events containing a source Internet Protocol (IP) address internal to the network that has not already been discovered in the network; and
  report that the new asset with the internal source IP address was discovered in the network to a management console configured to include the new asset in an updated model associated with the network.

29. The non-transitory computer-readable storage medium recited in claim 28, wherein executing the computer-executable instructions the processor further causes the processor to determine that the source IP address is internal to the network based on the source IP address falling within a first range that indicates IP addresses internal to the network and not falling within a second range that indicates exceptions to the IP addresses internal to the network.

30. The non-transitory computer-readable storage medium recited in claim 21, wherein a primary log correlation engine server hosts a primary instance of the log correlation engine and one or more auxiliary log correlation engine servers host one or more auxiliary instances of the log correlation engine, and wherein executing the computer-executable instructions the processor further causes the processor to:
  direct the one or more logs that contain the one or more text strings associated with the one or more events describing the observed activity in the network to the primary log correlation engine server; and
  cause the primary log correlation engine server to monitor workloads across the one or more auxiliary log correlation engine servers and automatically distribute the one or more received logs to balance a processing load among the primary log correlation engine server and the one or more auxiliary log correlation engine servers.

31. The system recited in claim 4, wherein the port corresponds to a proxy daemon associated with the one or more passive scanners to enable a management console to pull the information about the discovered new vulnerability from the log correlation engine.

32. The system recited in claim 5, wherein the one or more processors associated with the log correlation engine are further configured to:
  determine, from the one or more text strings that describe the network traffic involving the at least one internal host, a destination network address and a destination port number associated with the observed activity on the least one internal host that matched the vulnerability regular expression, wherein the report further includes the destination network address and the destination port number associated with the observed activity that matched the vulnerability regular expression.

33. The system recited in claim 1, wherein the one or more processors associated with the log correlation engine are further configured to transfer a file that contains the information about the new vulnerability discovered in the network to a management console over a Secure Shell (SSH).

34. The system recited in claim 1, wherein the one or more processors associated with the log correlation engine are further configured to:
  discover a new asset that was previously unknown in the network in response to the one or more events containing a destination Internet Protocol (IP) address internal to the network that has not already been discovered in the network; and
  report that the new asset with the internal destination IP address was discovered in the network to a management console configured to include the new asset in an updated model associated with the network.

* * * * *